US006882335B2

(12) United States Patent
Saarinen

(10) Patent No.: US 6,882,335 B2
(45) Date of Patent: Apr. 19, 2005

(54) STEREOPHONIC REPRODUCTION MAINTAINING MEANS AND METHODS FOR OPERATION IN HORIZONTAL AND VERTICAL A/V APPLIANCE POSITIONS

(75) Inventor: Pertti Saarinen, Salo (FI)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 09/775,357

(22) Filed: Feb. 1, 2001

(65) Prior Publication Data

US 2001/0011993 A1 Aug. 9, 2001

(30) Foreign Application Priority Data

Feb. 8, 2000 (GB) .............................................. 0002866

(51) Int. Cl.[7] .............................. G09G 5/00; G06F 1/16
(52) U.S. Cl. ........................ 345/156; 361/681; 361/683; 348/794
(58) Field of Search ................................. 361/680–683; 341/20–26; 381/59, 333, 335, 336, 386–388, 87; 348/794; 345/156, 169, 173, 158

(56) References Cited

U.S. PATENT DOCUMENTS

| 4,570,158 | A |   | 2/1986 | Bleich et al. |
| 5,396,301 | A | * | 3/1995 | Sasaki et al. ............... 348/794 |
| 5,640,627 | A | * | 6/1997 | Nakano et al. ............. 396/296 |
| 5,661,632 | A |   | 8/1997 | Register |
| 5,708,561 | A | * | 1/1998 | Huilgol et al. .............. 361/681 |
| 6,078,497 | A | * | 6/2000 | Derocher et al. ........... 361/683 |
| 6,597,384 | B1 | * | 7/2003 | Harrison ..................... 345/169 |
| 2002/0140675 | A1 | * | 10/2002 | Ali et al. ..................... 345/158 |

FOREIGN PATENT DOCUMENTS

| EP | 0458316 | 11/1991 |
| EP | 0587161 | 3/1994 |
| EP | 0766168 | 4/1997 |
| GB | 2317489 | 3/1998 |
| GB | 2331204 | 5/1999 |
| WO | 9100586 | 1/1991 |
| WO | 9419736 | 9/1994 |

* cited by examiner

Primary Examiner—Amr A. Awad
Assistant Examiner—Alecia D. Nelson

(57) ABSTRACT

Display apparatus including a display and an orientation sensitive interface mechanism is disclosed. In an exemplary embodiment, the orientation sensitive interface includes first and second loudspeaker pairs. The first loudspeaker pair includes first and second loudspeakers and the second loudspeaker pair includes the second and third loudspeaker. The first and second loudspeaker pairs are disposed along transverse directions to each other. The display apparatus comprises a switch which switches between the first loudspeaker pair and the second loudspeaker pair. By providing the respective loudspeaker pairs, and switching between them, it is possible to orient the display apparatus in transverse directions corresponding to respective loudspeaker pairs, yet maintain a substantially stereophonic reproduction for each orientation.

19 Claims, 13 Drawing Sheets

(a)

(b)

STEREOPHONIC REPRODUCTION MAINTAINING MEANS AND METHODS FOR OPERATION IN HORIZONTAL AND VERTICAL A/V APPLIANCE POSITIONS

BACKGROUND OF THE INVENTION

1. Technical Field

The present invention relates to display apparatus and methods of operation therefor. In particular, but not exclusively, the present invention relates to display apparatus comprising an orientation sensitive user interface mechanism.

2. Discussion of Related Art

Various types of display apparatus are well known, for example cathode ray tubes, liquid crystal displays and plasma displays, such as may be used for television or visual display units for computer systems, or hand or palm held computers. Many types of display apparatus are associated with or include orientation sensitive interface mechanisms. For example, user interface mechanisms such as keyboards or keypads, microphones, loudspeakers and the displayed image itself.

Taking loudspeakers as an example, typically, television displays, and increasingly VDU displays, have integral speakers which are configured to provide stereophonic sound reproduction for a viewer. Such displays may be used as mobile display appliances or apparatus to provide highly versatile display media for conferences, seminars, advertising and information points such as tourist information, and for personal mobile computing devices, for example. The image displayed on the display can be dynamic and may even be alterable by a user inputting control signals in response to a menu display, for example. Audio feedback and information may be conveyed to the viewer via the speakers. Displays may be entirely portable or may be movable between different locations although removably fixed into place during operation. Furthermore, depending upon the nature of the image to be displayed, the display apparatus may be configured in a landscape or portrait orientation. That is to say, in a landscape orientation the display axis having the greatest dimension is substantially horizontal, whilst in the portrait orientation the axis having greatest dimension is substantially vertical.

In stereophonic reproduction, two loudspeakers, conventionally referred to as left and right speakers as viewed from an observer, and labelled 2 and 4 respectively in FIG. 1, are each fed with a respective audio signal. The respective audio signals are such that when the speakers 2,4 are appropriately disposed along a stereo baseline 6 with respect to each other and to a listener 8, the listener experiences an audio image representative of the source from which the audio signal was created. That is to say, the listener experiences a spatial audio image. In order for the stereophonic effect to be reproduced accurately, the speakers 2,4 and listener 8 should be disposed relative to each other such that the stereo baseline 6 subtends an angle of 60° with respect to the listener 8. In other words, the speakers 2, 4 and listener 8 should preferably form the vertices of an equilateral triangle.

Referring now to FIGS. 2 and 3, displays in both the landscape orientation, FIGS. 2a and 3a, and portrait orientation, FIGS. 2b and 3b, are illustrated. FIG. 2 illustrates a display apparatus 20 having a display 22. The display apparatus 20 also comprises four speakers 24 respectively disposed at each corner of the display apparatus.

Referring now to FIG. 3, further display apparatus 20 is illustrated, having a display 22 and four speakers 24. However, in the apparatus illustrated in FIG. 3, the speakers 24 are each disposed at a halfway point along respective sides of the apparatus 20.

FIGS. 2a and 3a illustrate the display apparatus 20 configured in landscape orientation, and FIGS. 2b and 3b in a portrait orientation. The landscape orientation is defined as the longest dimension of the display 22 being horizontal relative to a viewer, and the portrait orientation is defined as the longest dimension of the display 22 being vertical relative to a viewer. The terms "horizontal" and "vertical" are used herein with reference to a viewer and are to be interpreted within that context and should not be limited to any strict geometrical meaning which the respective words might have. Furthermore, the terms "viewer" and "listener" are used interchangeably and are not limiting on the scope of the invention or appended claims.

The provision of four speakers for the display apparatus illustrated in FIGS. 2 and 3 is important with regard to the maintenance of a stereo base for both landscape and portrait orientations.

In a landscape orientation, the display mode of the display apparatus would generally also be landscape, and the display of FIG. 2a would typically produce stereo sound by utilising speakers 24a and 24b to provide the left channel speakers, and speakers 24c and 24d to provide right channel speakers, denoted in FIG. 2a by Lll and Llr, respectively, for the stereo base. In FIG. 3a, single speakers 24a and 24c provide the left and right speakers for the stereo base and are also denoted Lll and Llr, respectively. When the display apparatus 20 is in a portait orientation, with the display mode also in portrait mode, the respective speaker pairs forming the left channel speakers Lll and right channel speakers Llr for the landscape orientation are at the bottom and top of the display, respectively. Consequently, they are unsuitable for providing a tereo base to a viewer for the display being in a portrait orientation.

When the display apparatus is placed in a portrait orientation, as illustrated in FIG. 2b, the speakers providing the stereo base in the landscape orientation are now disposed at the top and bottom of the display apparatus. Consequently, it is necessary to switch operation of the speakers to speakers 24a and 24c (Lpl) and speakers 24b and 24d (Lpr) in order to provide the left and right channels, respectively, of the stereo base for the portrait orientation. Such switching is known in the prior art.

Referring now to FIG. 3a, speaker 24a provides the left channel speaker (Lll) and speaker 24c provides the right channel speaker (Llr) in the landscape orientation. FIG. 3b illustrates the display in portrait orientation with speaker 24d providing the left channel speaker (Lpl) and speaker 24b providing the right channel speaker (Lpr).

A drawback of the known display apparatus illustrated with reference to FIGS. 2 and 3 is that they require at least four speakers. In order to operate correctly, the speakers need to be of sufficient size and, consequently, any display apparatus must have a sufficiently large housing in order to incorporate and support the speakers. Thus, the display apparatus housing can become bulky and unattractive. This is a particular problem when the display apparatus is part of a mobile or portable device, for example a laptop or hand/palm held personal computer or display device, a personal digital assistant or a wireless telephone, since the provision of housing for bulky loudspeakers is inconsistent with the general desire to provide lightweight, low-volume, portable devices. An example of a multimedia portable wireless device is the Nokia™ Communicator™.

SUMMARY OF THE INVENTION

In accordance with a first aspect of the present invention, there is provided display apparatus, comprising:

a display;

an orientation sensitive interface mechanism operable in first and second modes corresponding to respective first and second orientations of said display; and selection means for selecting operation of said orientation sensitive interface mechanism in said first or second mode.

Embodiments of display apparatus in accordance with a first aspect of this invention provide for significant flexibility and options in the orientations of the display apparatus which may be adopted by a user. This provides the advantage that the display apparatus may be oriented to be optimal for the purpose to which it is put. In particular, for portable, handheld devices which are easily manipulable by a user into different orientations, for example according to the orientation of the displayed image, the orientation sensitive interface mechanism may be suitably configured for the desired orientation of the device by the user. This greatly enhances the utility of the display apparatus and devices incorporating such display apparatus.

Preferably, the display apparatus comprises orientation sensing means for determining an orientation of the display which is operable to activate the selection means in accordance with the orientation. More preferably, activation of the selection means is automatic.

Suitably, the orientation sensing means is operable to determine the orientation relative to the surface of the earth. Thus, the orientation sensing means senses orientation relative to a typical viewer of the display apparatus.

Optionally, the selection means is user operable, preferably manually operable.

In accordance with a particular embodiment of the present invention, particularly suitable for portable electronic devices, said orientation sensing means comprises a display mode sensor responsive to a display mode for an image to activate the selection means to select the first or second mode of the orientation sensitive interface mechanism in accordance with a sensed display mode. Typically, the mode sensor is responsive to a display mode control signal. This advantageously configures operation of the interface mechanism to correspond to the display mode utilised by the display apparatus. It is particularly useful for mobile electronic devices, where the physical orientation of the display apparatus may be easily varied. Thus, it may more often be the case that it is the display mode of the image that determines the physical orientation of the display apparatus relative to a user. That is to say, a user of the electronic device will orientate it according to the display mode of the image.

Typically, the display comprises one dimension corresponding to a first direction which is greater than a dimension corresponding to a second direction, thereby respectively defining a landscape and a portrait orientation for the display.

In another aspect of the invention, the orientation sensitive interface mechanism includes display apparatus according to any preceding claim, said orientation sensitive interface mechanism including:

a first loudspeaker pair comprising a first and second loudspeaker disposed along a first axis corresponding to said first orientation; and a third loudspeaker, said second and third loudspeaker forming a second loudspeaker pair disposed along a second axis corresponding to said second orientation;

said selection means operable to select said first or second loudspeaker pair for operation in said first or second mode, respectively.

Thus, an embodiment in accordance with this aspect of the invention is capable of providing substantially stereophonic sound images for respective orientations of the display apparatus. Additionally, only 3 loudspeakers are utilised, compared to the prior art configurations which require 4 loudspeakers. Thus the cost, weight and volume of the display apparatus may be reduced compared to the known systems. Optionally, higher quality speakers may be included for substantially the same cost. Furthermore, it is possible to provide the advantage that it is possible to orientate the display apparatus in transverse directions yet still utilise an appropriate loudspeaker pair in accordance with selected orientations. This is particularly suitable if the display apparatus is to display images in different orientations with accompanying stereophonic sound.

Suitably, the loudspeakers for respective first and second loudspeaker pairs are disposed relative to each other in order to provide substantially stereophonic sound images.

Preferably, the display apparatus comprises audio circuitry which is selectable to adapt a signal input thereto to provide a substantially stereophonic image from the first or second loudspeaker pair. Such signals would typically comprise right and left channel stereophonic signals and the audio circuitry would be so-configured. Thus, the audio circuitry may adapt signals to compensate for configurations in which respective speakers of either one of the first or second pair of loudspeakers are not located in optimum positions to provide stereophonic image.

Typically, the audio circuitry is operable to provide stereo extension means to widen the stereophonic image produced by the first or second loudspeaker pair. Such audio circuitry is particularly suitable for portable devices, in which the speakers of respective loudspeaker pairs are unlikely to be able to be located sufficiently far apart to provide a proper stereophonic image. By adapting the signals in order to widen the stereophonic image, improved audio listening may be achieved. Typically, the stereo extension means introduces phase delay between right and left channel stereophonic signals, such phase delay introduced by coupling the right and left channel stereophonic signals by circuitry providing the phase delay.

Audio circuitry operable to adapt stereophonic signals for both landscape and portrait orientations or display modes advantageously compensates for the physical separation of respective loudspeakers in each loudspeaker pair being too small for good stereophonic reproduction such as may be the case for portable devices. Thus, the audio circuitry electronically "widens" the stereo base provided by the loudspeakers by a different amount according to the display apparatus orientation or display mode.

In a particular embodiment, the audio circuitry is operable to introduce a phase delay between the right and left channel stereophonic signals to widen the stereophonic image produced by the first or second loudspeaker pair. Suitably, the right and left channel stereophonic signals are coupled together via the phase delay.

Optionally, the audio circuitry is selectable to introduce a phase delay for just one of the first or second loudspeaker pair. This is particularly advantageous since one of the loudspeaker pairs may be configured to produce an optimum stereophonic image for a default, or typically used, display orientation or display mode. Thus, the widened stereophonic image, which is typically of lower quality than an unmodified stereophonic image, is used for the non-default less-frequently-used orientation or display mode.

Optionally, the audio circuitry may introduce a stereo extension means phase delay for only one of the first or second loudspeaker pair. This would be the case where the speakers of at least one respective first or second loudspeaker pairs are separated by an amount sufficient to provide good stereophonic sound reproduction.

Each of the loudspeakers can comprise more than one drive unit, that is to say more than one movable membrane and drive circuitry. Such speakers comprising more than one unit will be suitable for high quality sound reproduction.

In accordance with a further embodiment of the invention, there is provided display apparatus according to any preceding claim, further comprising:

a touch sensitive display;

said orientation sensitive interface mechanism including a display driver operable in said first mode to display a graphic symbol disposed corresponding to said first orientation and in said second mode to display said graphic symbol disposed corresponding to said second orientation.

Such an embodiment advantageously provides for appropriate orientation of asymmetric graphic symbols according to the orientation of the display apparatus.

In particular, the display driver is operable in the first mode to display an image of keyboard on the touch sensitive display disposed corresponding to the first orientation, and operable in a second mode to display an image of a keyboard in a second orientation. Such keyboards may be a QWERTY type keyboard or a numeric keypad. Optionally, the keyboard may comprise special function keys. Thus, a user is able to orientate the display apparatus in whatever suitable orientation they desire, yet still have the user interface, in this case the keyboard or graphic symbols oriented accordingly.

In particular, the graphic symbol may be an asymmetric cursor symbol.

In a yet further embodiment in accordance with the invention, the orientation sensitive interface mechanism includes first and second microphones disposed to be operative for first and second orientations respectively, the selection means being operable to select the first or second microphone for said first or second mode, respectively.

In a further embodiment in accordance with this aspect of the invention, the first and second microphones each comprise a stereo microphone. Thus, each stereo microphone may be positioned in the display apparatus such that it is operable for respective first and second orientations of the display apparatus. Optionally, the first and second microphones may each comprise a directional microphone.

In a yet still further aspect of the invention, the orientation sensitive interface mechanism includes a viewing angle for the display. The display apparatus also comprises viewing angle adaptation means which is operable in the first mode to adapt the viewing angle for the first orientation, and in the second mode to adapt the viewing angle for the second orientation. The viewing angle adaptation means is responsive to the selection means to operate in the first or second mode.

Suitably, the viewing angle adaptation means comprises a further sensor for sensing the display apparatus disposed in a substantially flat orientation relative to the surface of the earth.

In a still yet further embodiment according to the present invention, the orientation sensitive interface mechanism comprises a display driver responsive to the selection means to operate in respective first and second modes to display an image on the display in respective first and second orientations.

In a further embodiment of the invention, the display apparatus includes a digital camera and a display driver operable to display an image derived from the digital camera on the display.

In a preferred embodiment, the loudspeakers for respective first and second loudspeaker pairs are disposed relative to each other for providing a substantially stereophonic sound image. Thus, substantially stereophonic sound reproduction may be achieved for respective orientations of the display apparatus.

A particularly advantageous embodiment of the present invention is in a portable electronic device, preferably comprising a transceiver and antenna for communicating with a wireless communications network. Such a portable electronic device would also comprise a keyboard or keypad for inputting data or control signals thereto, and would provide a suitable portable multimedia platform.

In particular, the portable electronic device may be configured as a personal digital assistant, or palm or hand held personal computing device and may be operable to communicate with the Internet.

Yet more advantageously, the portable electronic device may further comprise a microphone such that it may be operable as a wireless telephone. The microphone may be one of the aforesaid microphones referred to in accordance with a yet further embodiment of the invention. Suitably, the mobile electronic device will be operable with a wireless communication network such as a cellular telephone network. Further advantageously, the antenna may have a modifiable radiation pattern, preferably electronically steerable, which operates in respective modes to rotate radiation patterns optimised for respective first and second orientations. Suitably, the antenna is an electronically steerable beam antenna. Thus, aspects of the present invention include interface mechanisms other than user interface mechanisms.

An electronically steerable beam is particularly advantageous, since the antenna may be fixed, and have a fixed coupling to the tranceiver. Such fixed couplings are less lossy than movable or rotatable couplings.

In accordance with a yet further aspect of the present invention, there is provided display apparatus comprising:

a display;

a first loudspeaker pair including a first and second loudspeaker disposed along a first direction; and a third loudspeaker, said second and third loud speakers forming a second loudspeaker pair disposed along a second direction transverse to said first direction; and further comprising selection means for selecting operation of said first loudspeaker pair or said second loudspeaker pair.

In accordance with a still yet further aspect of the invention, there is provided a method for providing a stereophonic image from a display apparatus including first and second loudspeaker pairs disposed transverse to each other, the method comprising selecting said first or second loudspeaker pair in accordance with an orientation of said display apparatus.

Each of the first, second and third loudspeakers may include more than one drive unit. For example, treble, mid and bass range drive units, and the term "speaker" should not be interpreted to restrict the scope of the appended claims to a single speaker or drive unit.

BRIEF DESCRIPTION OF THE DRAWINGS

Preferred embodiments in accordance with the present invention will now be described, by way of example only, with reference to the drawings, of which

DETAILED DESCRIPTION OF PREFERRED EMBODIMENTS

Figure 1:
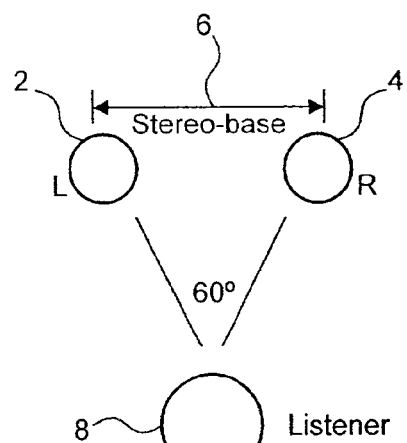
FIG. 1 is a schematic illustration of a loudspeaker/listener configuration for stereo reproduction.
Figure 2:
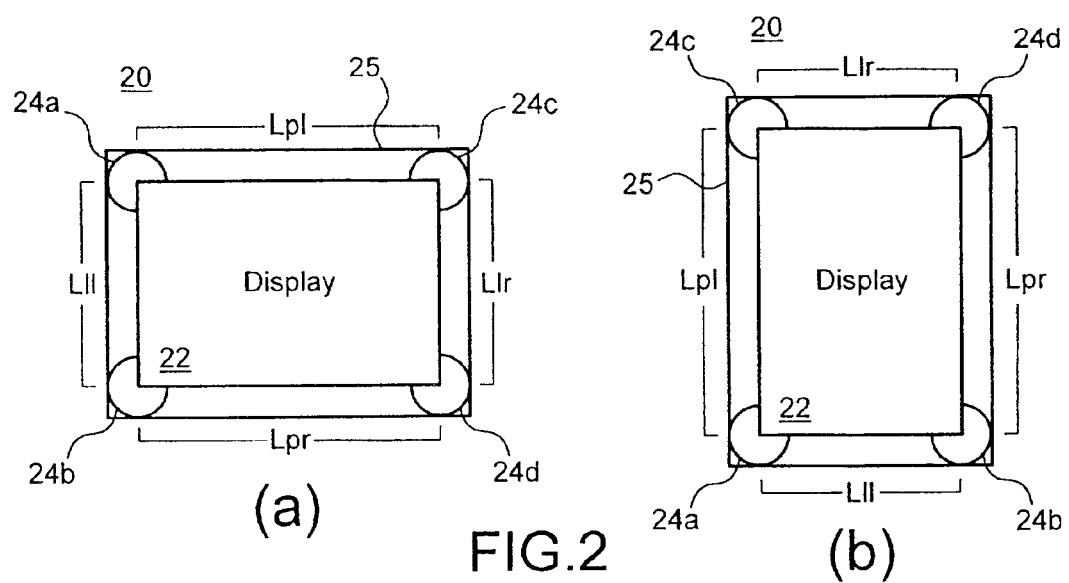
FIG. 2 schematically illustrates a first type of display apparatus in (a) landscape and (b) portrait orientations.
Figure 3:
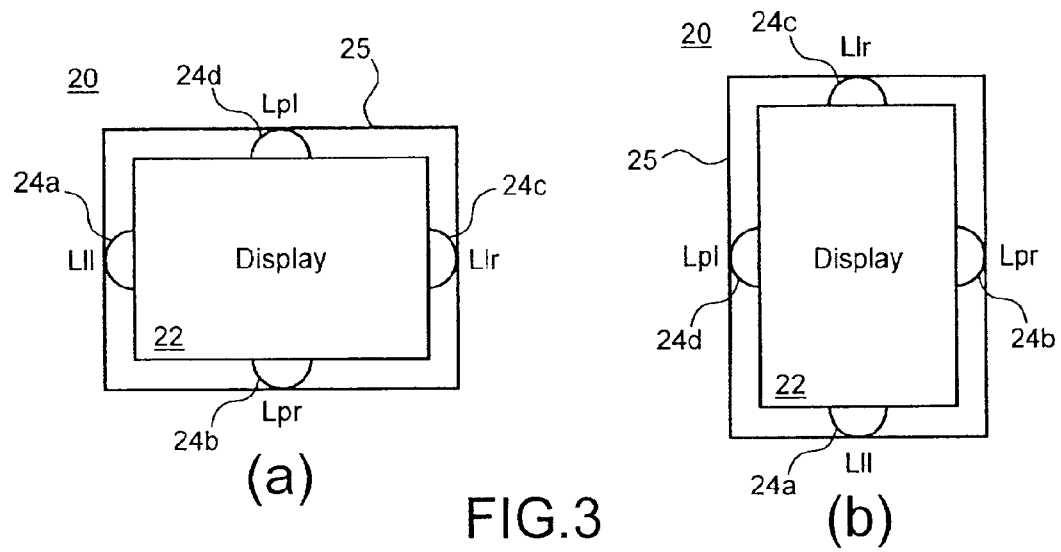
FIG. 3 illustrates a further display apparatus in (a) landscape and (b) portrait orientations.

Various embodiments in accordance with the present invention will now be described, wherein like parts will be referred to by like reference numerals. Embodiments including various examples of display orientation sensitive user interface mechanisms will be described, as will examples of other orientation sensitive mechanisms.

Figure 4:
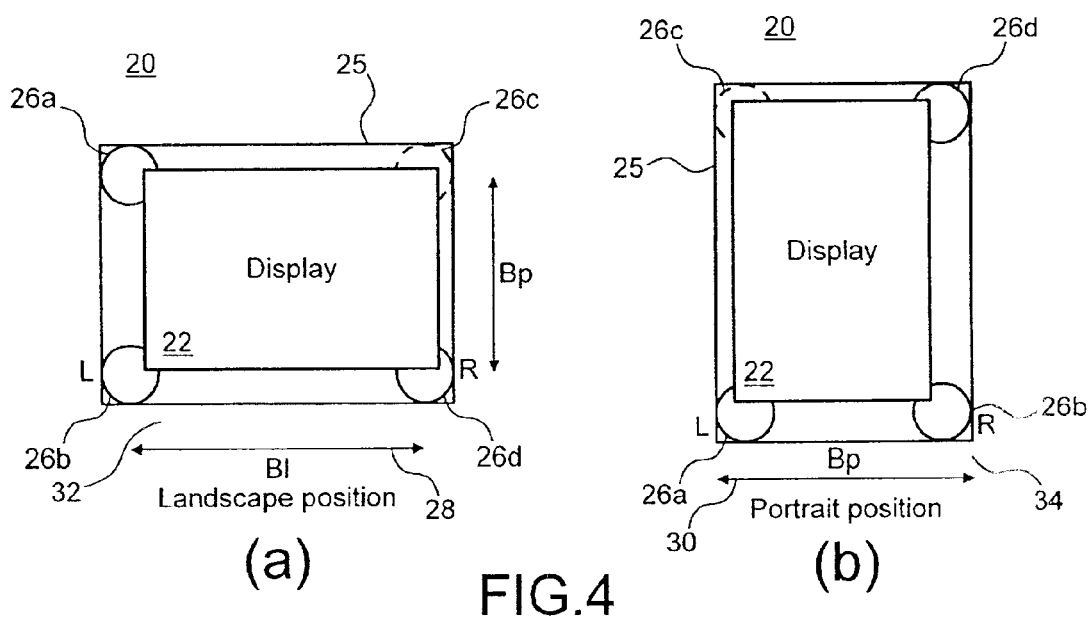
FIG. 4 illustrates a display apparatus in accordance with an embodiment of the invention in (a) landscape and (b) portrait orientation.

Referring now to FIG. 4, there is illustrated display apparatus 20 in accordance with a first embodiment of the present invention. The display apparatus 20 may be part of a television receiver for receiving television signals or may be a display monitor for a computer system, such as a personal computer or a portable device. The display apparatus 20 comprises a display 22 e.g. cathode ray tube, liquid crystal display or plasma display mounted in a housing 25 which also supports a plurality of loudspeakers 26 mounted in respective speaker regions. In this example, speakers 26 comprise a display orientation sensitive user interface mechanism. In a minimum system configuration, each speaker region comprises one drive unit or speaker 26. However, in embodiments where particularly faithful sound reproduction is necessary (high-fidelity), each speaker may comprise more than one drive unit, i.e. movable membrane and driving circuitry, respectively directed to reproducing sounds in particular frequency ranges, for example treble, mid range and bass range. Speakers 26a, 26b and 26d are shown in solid outline, whilst speaker 26c is shown in dotted outline. The reason for such representation of the display apparatus will become evident from the following description.

In accordance with the following described embodiment, the display apparatus comprises three speaker regions corresponding to three speakers, 26a, 26b and 26d. As discussed above, each speaker region may comprise more than one speaker 26. In the landscape orientation illustrated in FIG. 4a the left and right speaker regions comprise speakers 26b and 26d respectively. These speaker regions provide the stereo base (B1) 28 for the landscape orientation. In this configuration, the stereo base 28 lies to the bottom of display region 22 as seen by a viewer. When operating in the landscape orientation of FIG. 4a, the display apparatus is configured such that speakers 26b and 26d respectively output left and right channels for stereo reproduction of sound. Speaker 26a is inactive.

The display apparatus 20 may also be configured in a portrait orientation as illustrated in FIG. 4b. In this configuration, the display apparatus utilises speakers 26a and 26b to provide the stereo base (Bp) 30 which receive the left and right channels respectively. Speaker 26d is inactive in the portrait orientation. In the configurations illustrated in solid outline in FIG. 4, the stereo base 28 and 30 is to the bottom of the display 22 for both the landscape and portrait orientations, respectively.

Although speakers 26a and 26b have been described as inactive with regard to respective landscape and portrait orientations, such inactivity is only in respect of stereo sound reproduction. The speakers may be active to provide user feedback such as a keyboard/keypad "click" for apparatus comprising a touch sensitive keyboard/keypad. Optionally, the speakers may be used to provide a telephone ring tone when the apparatus comprises a telephone.

The foregoing has been described on the assumption that the display has a designated lower side 32 and 34 for respective landscape and portrait orientations.

Optionally, the display apparatus may be configured such that speakers 26a and 26c are active for the landscape position, in which case either speaker 26b or 26d would be unnecessary. If speaker 26b is provided, then the display apparatus 20 would have to be rotated through 90° in a clockwise direction to the portrait orientation in order to maintain a stereo base towards the top of the display, comprising speaker 26b for the left channel and speaker 26a for the right channel. Alternatively, if speaker 26d was used, then the display apparatus would have to be rotated 90° in an anticlockwise direction to the portrait orientation wherein speaker 26c comprises the left channel and speaker 26d comprises the right channel. Such a configuration is illustrated in FIG. 4b.

Although particular speaker configurations have been described above, it will be evident to a person of ordinary skill in the art that further speaker region configurations may be utilised.

Display apparatus having various speaker configurations have been described in which the stereo base may be maintained for both landscape and portrait orientations of the display apparatus using only three speakers. Such display apparatus is particularly suitable as mobile or removably attachable dynamic displays for information points or adverts at temporary or semi-permanent events such as conferences or seminars, for example. The display apparatus may be suitably mounted in either landscape or portrait orientation in order to suit its particular purpose for the event at which it is being used.

When using display apparatus such as described, it is generally known in advance in which configuration it is to be utilised, i.e. landscape or portrait orientation. The display apparatus is mounted in accordance with the desired orientation. Typically, the display mode is also known in advance, often determining the orientation of the display apparatus. Optionally, the display apparatus may be configured to respond to an orientation sensing means to automatically display an image in accordance with a sensed orientation of the display apparatus. The appropriate or desired speaker configuration for the display apparatus orientation is selected by means of a switch. An example of display apparatus circuitry comprising means for switching between different speaker configurations will now be described with reference to FIG. 5 of the drawings.

Figure 5:
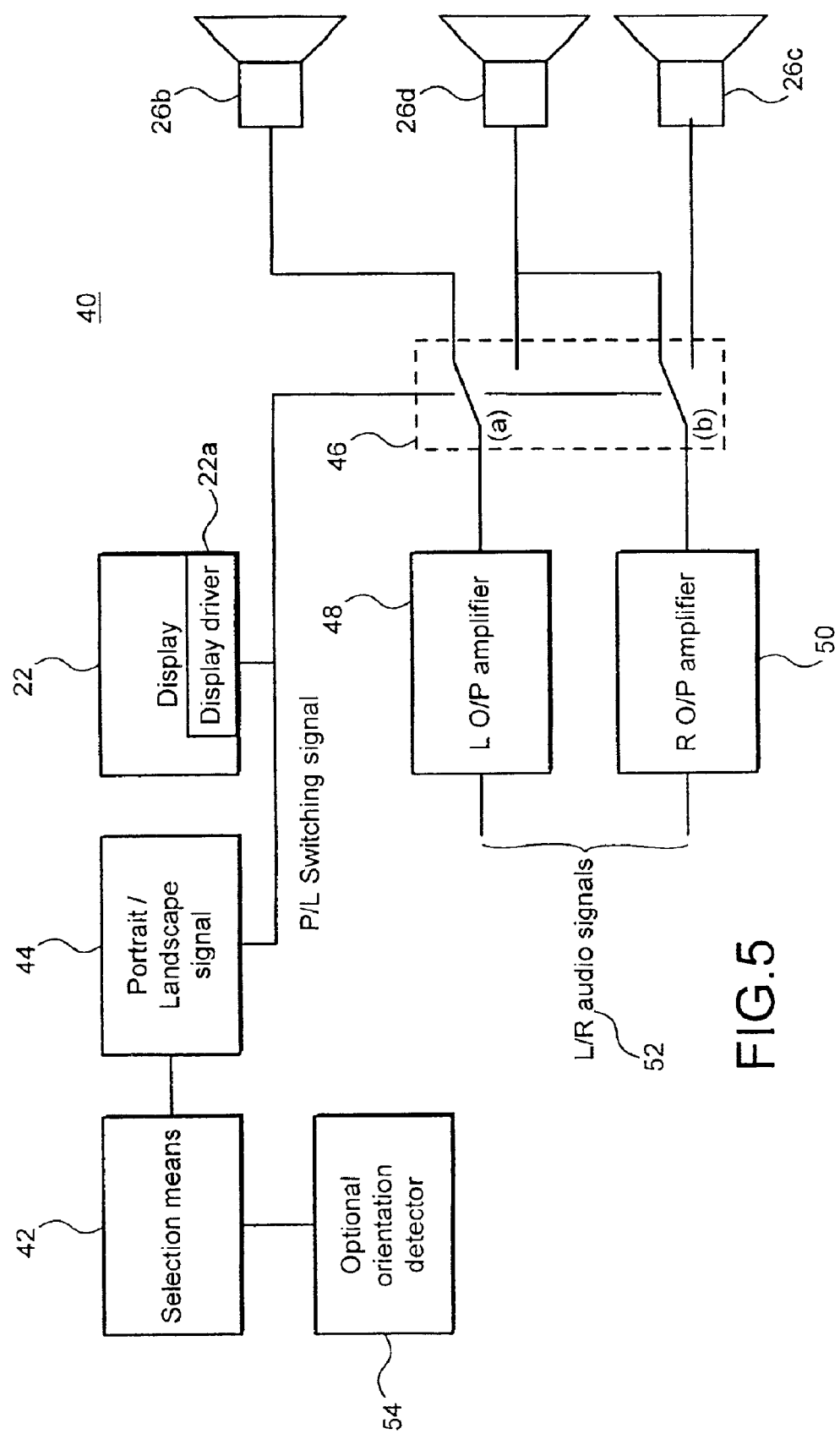
FIG. 5 is a schematic illustration of a circuit configuration for an embodiment of the invention.

The circuitry schematically illustrated in FIG. 5 is configured to switch speaker configurations between arrangements for portrait and landscape orientations of the display apparatus. Circuitry 40 comprises a display 22, typically associated with display driver circuitry 22a for receiving a display signal and driving the display 22 in accordance with received display signals. The circuitry also comprises loudspeakers 26b, 26d and 26c. Circuitry 40 further comprises a switch 42 for providing means for selecting either the portrait or landscape speaker configurations. Suitably, the switch is a simple manual two pole switch which may be operated to provide a portrait or landscape (P/L) switching signal 44. The P/L switching signal 44 is input to display 22 and the associated display driver 22a configures input display signals to be displayed in either portrait or landscape mode in accordance with the switching signal. P/L switching signal 44 is also input to switch 46. Switch 46 comprises a first switch 46a which, on its input side, is coupled to left channel amplifier 48 and on its output side may be switched between speakers 26b and 26d, respectively. Switch 46 also comprises switch 46b which, on its input side, is coupled to the right channel output amplifier 50 and on its output side may be coupled to either speaker 26d or 26c, respectively. Left and right channel output amplifiers 48 and 50, respectively, receive left and right audio signals 52 from a suitable audio source. Circuitry 40 may also optionally include an orientation detector 54 which will be described in greater detail later.

The circuitry illustrated in FIG. 5 may be implemented in many different ways. For example, it may be implemented by means of hardwired circuitry, or a computing or processing resource such as a suitably configured digital signal processor, microcontroller or general purpose microprocessor or combinations thereof as will be apparent to the ordinary skilled addressee.

In operation, a person mounting or setting up the display apparatus 20 uses switch 42 to select the portrait or landscape operation mode. The P/L switching signal 44 is fed to display 22 where the display driver 22a responds by properly configuring the input display signal for displaying an image in accordance with the selected mode. Additionally, switches 46a and 46b are set by the P/L switching signal 44 to output the signals from the left and right channel output amplifiers to the appropriate speakers in accordance with the P/L switching signal 44. In the circuitry illustrated in FIG. 5, switch 42 is in the portrait position and a portrait switching signal 44 is input to display 22 and switches 46a and 46b. For such a portrait switching signal, switch 46a is configured to transfer a signal from the left channel output amplifier 48 to speaker 26b and switch 46b is configured to communicate a signal from the right channel output amplifier 50 to speaker 26d. For switch 22 in the landscape position, a landscape switching signal 44 would be input to switch 46a which would have its output coupled to speaker 26d and switch 46b would have its output coupled to speaker 26c. Thus, the circuitry 40 provides for switching between appropriate speaker configurations for portrait and landscape orientations of the display apparatus 20.

In an optional embodiment, an orientation detector 54 may be included in circuitry 40. Orientation detector 54 may comprise a tilt sensor such as Analog Devices ADXL202 Accelerometer described in "Analog Devices Technical Note Aug. 27, 1998 Rev A", for example. In the described embodiment, the orientation detector 54 is coupled to the switch 42. The orientation detector 54 is configured to determine whether the display apparatus 20 is in a landscape orientation or portrait orientation. A signal indicative of the detected display apparatus orientation is output from detector 54 to switch 42 which is configured to respond by switching to the appropriate position, whereby a portrait or landscape switching signal 44 is automatically provided to the display driver 22a associated with the display 22, and switches 46 in accordance with the output of orientation detector 54. Such automatic detection of the display apparatus orientation reduces the possibility of an incorrect switch setting.

Figure 6:
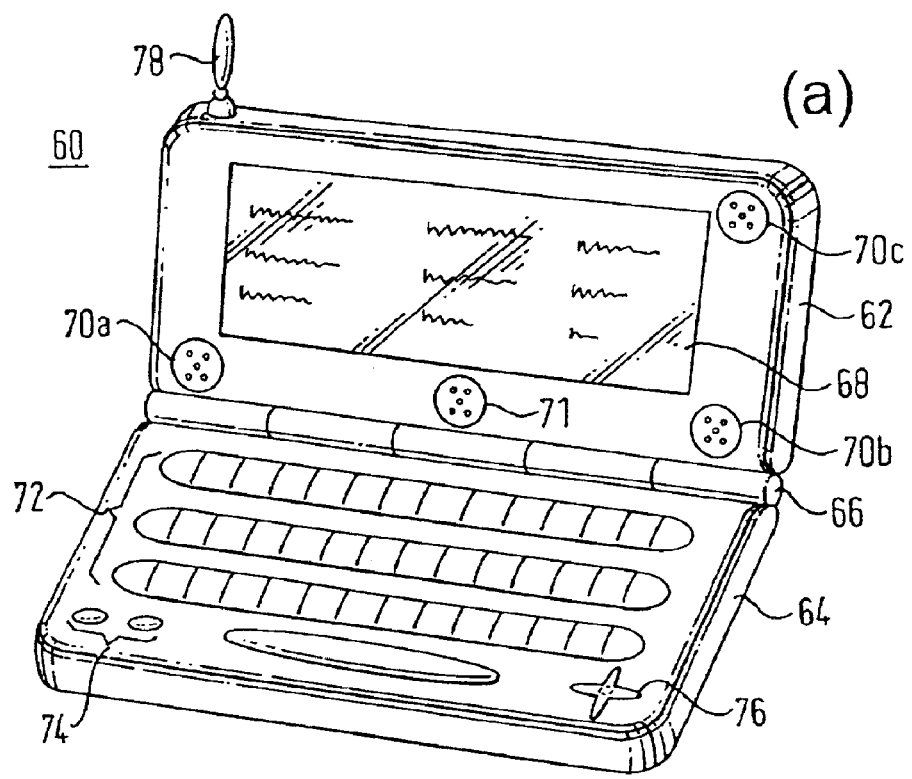
FIG. 6 illustrates a second embodiment of the invention in (a) landscape and (b) portrait orientation.
Figure 6:
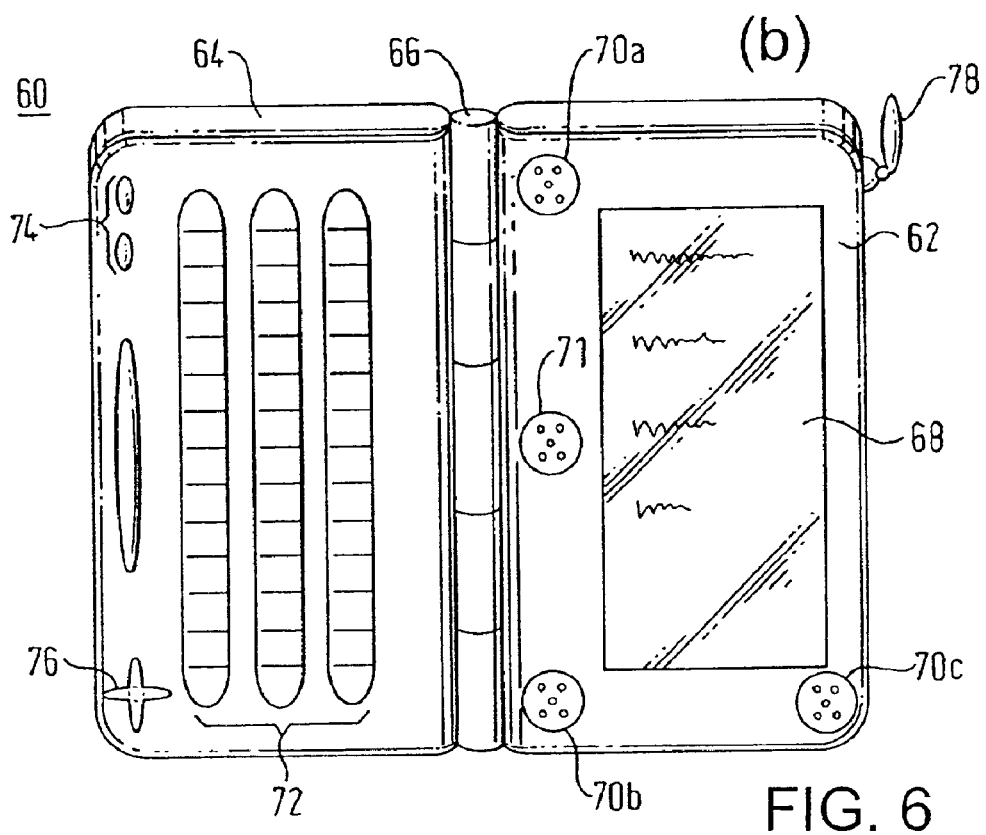

A second embodiment of the present invention comprises a mobile multimedia display apparatus (MDA) such as a wireless PDA, for example the Nokia™ Communicator™. In this second embodiment a display driver capable of driving the display in more than one display mode may be considered an orientation sensitive user interface mechanism also. An exemplary embodiment of an MDA 60 combining the functions of a PDA/personal computer and radio telephone apparatus is illustrated in FIG. 6 of the drawings. The MDA 60 comprises two parts 62 and 64 hinged together at 66. The first part, 62, comprises a display 68 and three speakers 70a, 70b and 70c. In a preferred embodiment, each speaker 70 comprises a single speaker which is less costly, less bulky and less expensive than using more than one speaker. Also included is a microphone 71 which is particularly useful when the MDA is used in a radio telephone mode.

The second part of the MDA, 64, includes a keyboard, 72, typically a QWERTY keyboard, and also special function keys 74 such as a menu key and delete key, and cursor control keys 76, for example. MDA 60 also includes a power supply, such as a rechargable battery pack and a processing resource such as a general purpose processor for controlling the functions of the MDA.

Additionally, a radio transceiver, not shown, is also included in the MDA 60 and is coupled to an antenna 78 for communication with a radio telephone network, for example.

MDA 60 is typically used in one of two physical orientations as respectively illustrated in FIGS. 6a and 6b. That is to say, in either a landscape or portrait orientation relative to the MDA user, and images can be displayed on the display 68 in either a landscape or portrait mode. Generally, MDAs are used placed on a flat surface such as a desk or on a user's lap. Different software applications resident on the MDA 60 may utilise different display modes for displaying an image. For example, a week diary/scheduler may use a landscape mode in order to display a full week's appointments, whereas a diary in a day mode may utilise a portrait mode in order to show a single day's appointments. For an MDA comprising a web browser, it is possible to connect the MDA to the internet and thence to a website from which information or software applications may be downloaded. It may be the case that different information or software applications are best viewed in one or other of the landscape or portrait display modes, with a user physically orientating the MDA accordingly. Optionally, it may be the case that a particular software application or data file comprises information which instructs the display driver of the MDA 60 to display the downloaded information in one or other of the portrait or landscape display modes. Typically, a default mode would be the landscape mode.

Figure 7:
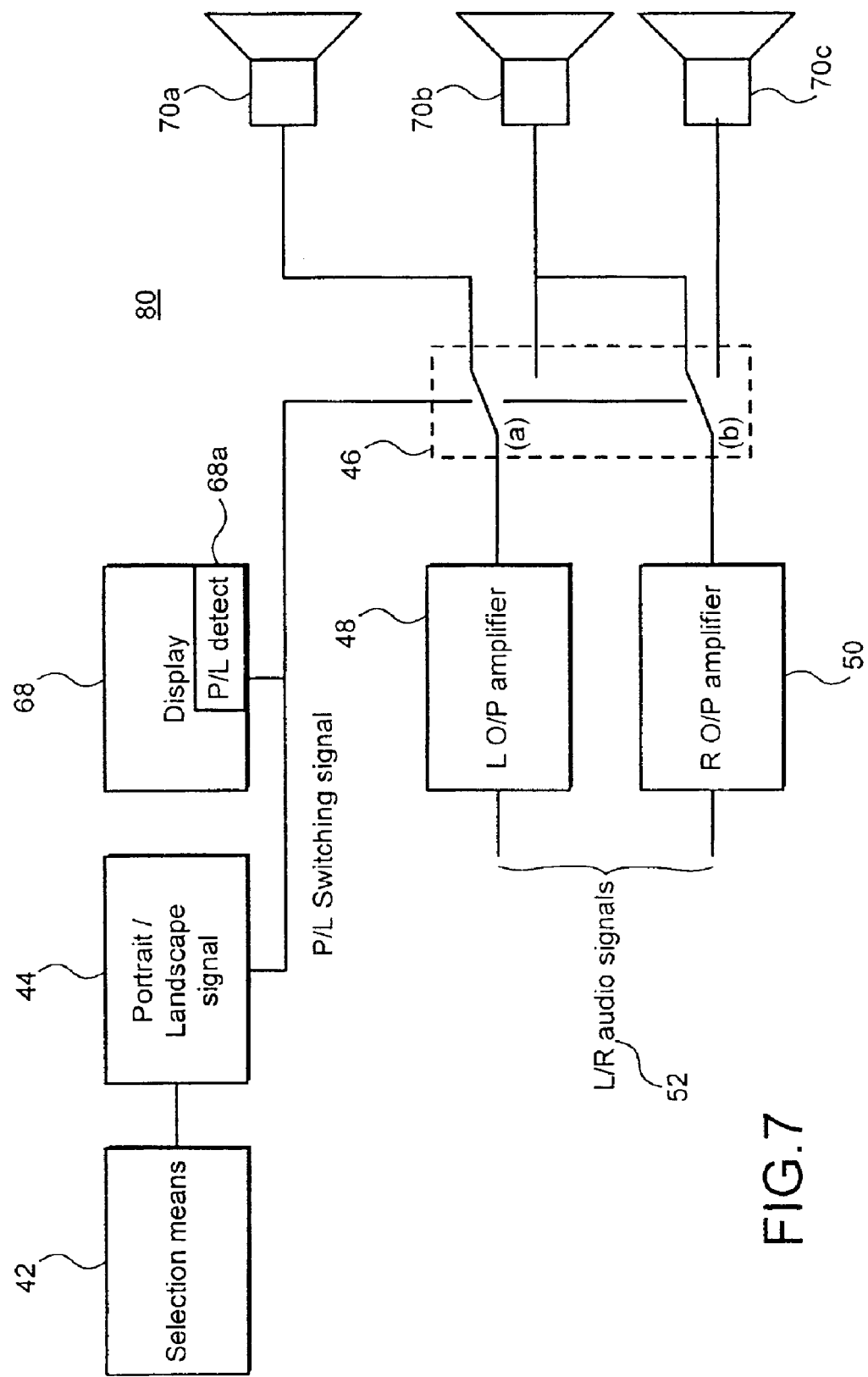
FIG. 7 is a schematic illustration of a circuit configuration for the embodiment illustrated in FIG. 6.

Referring now to FIG. 7, there is illustrated processing circuitry 80 suitable for MDA 60. In common with circuitry 40 illustrated with reference to FIG. 5, circuitry 80 comprises a switch 42 for generating a P/L switching signal 44. Switch 42 allows a user to select either portrait or landscape display mode for the MDA 60. Switch 42 may be implemented by means of a special function key 74 on the MDA 60 or by means of a menu selection displayed by the MDA. Optionally or additionally, the switch 42 may be automatically operated in response to a sensing device such as described with reference to FIG. 5, for example. The P/L switching signal 44 is input to display 68, and instructs a display driver associated with the display to display an image in the selected mode. Switches 46a and 46b also receive the P/L switching signal 44 which switches them to drive the speakers 70 in accordance with the selected display mode in order to maintain stereo sound reproduction relative to the display mode. In the embodiment illustrated in FIG. 7, switch 46a switches between the speaker 70a and speaker 70b, whilst switch 46b switches between speaker 70b and 70c. As shown, switches 46 are configured for the landscape mode as illustrated in FIG. 6a. Switch 46a receives an input signal from the left channel output amplifier 48, whilst switch 46b receives an input signal from the right channel output amplifier 50. Left and right audio signals 52 are input to respective amplifiers 48, 50 from a suitable audio source.

Display 68 includes within its associated display driver, a portrait/landscape (P/L) detector 68a. P/L detector 68a is configured to receive display mode control signals from the MDA controller or embedded within a display control signal forwarded to the display driver. For example, a local software application such as a diary/scheduler application, referred to above, may include a control signal to configure the display mode in accordance with the diary mode which has been selected by a user. In a week appointment display mode, the software application instructs the P/L detector 68a to display the image in a landscape mode, whilst a day appointment mode would comprise instructions for the P/L detector 68a to display the information in a portrait mode. Thus, the display will be automatically configured to use a display mode in accordance with the image being displayed. Additionally, the P/L detector 68a may also be sensitive to display mode signals in software or information downloaded from a remote source to the MDA, such as from a website. Optionally, the P/L detector 68a may be disposed other than in the display driver, for example as part of a general controller for the MDA 60.

P/L detector 68a also outputs a P/L switching signal 44 to switch 46 in order to configure the speakers in accordance with the expected physical orientation in which a user would place the MDA for the display mode to be utilised. Thus, not only can a display mode be automatically adjusted in accordance with an image to be displayed, but the speaker configuration may be correspondingly adjusted in order to maintain the stereo base for a user of the MDA 60 for any sound that may accompany the displayed image. Suitably, P/L detector 68a is configured to override a selection made via selection means 42.

Figure 11:
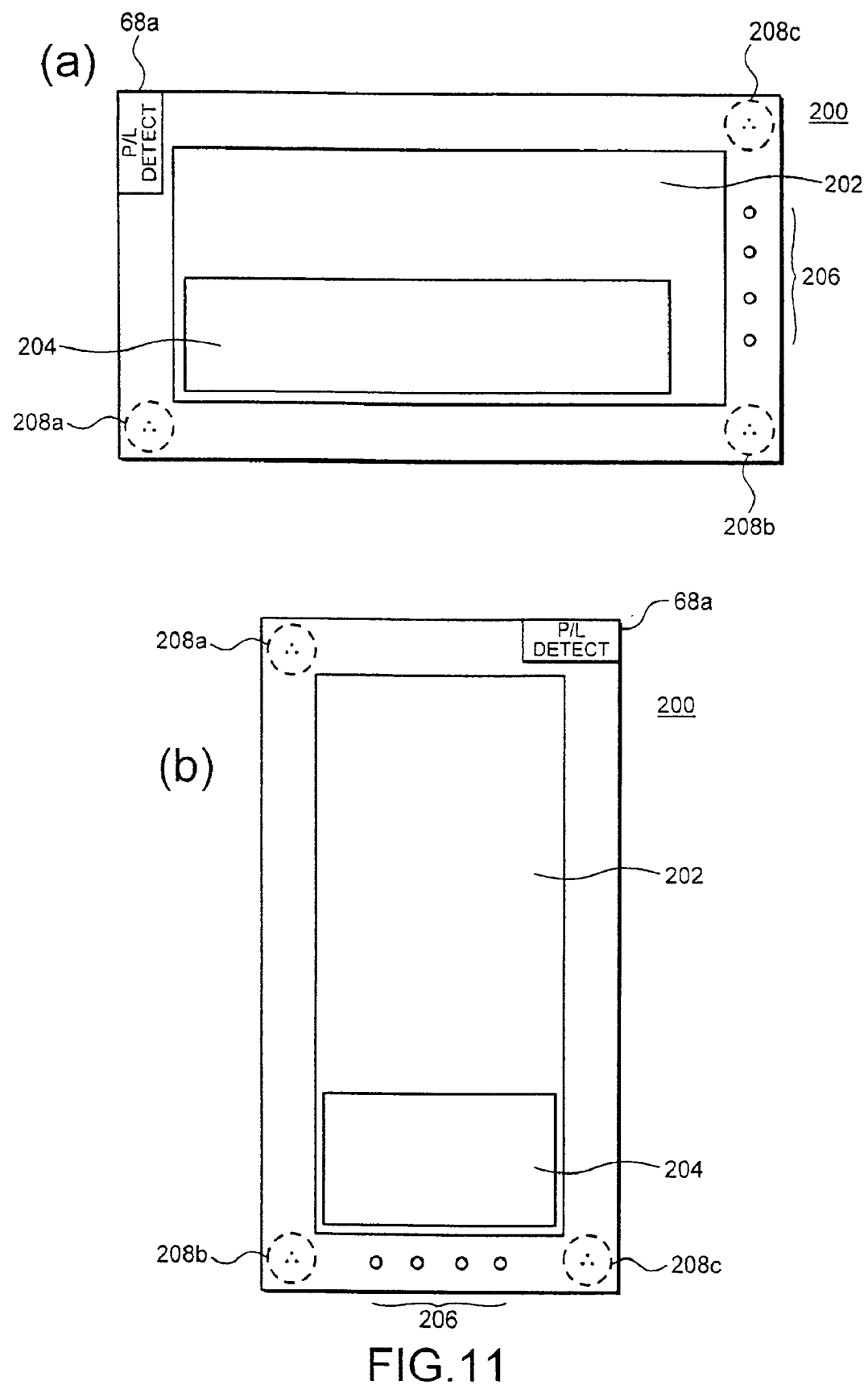
FIG. 11 illustrates a further embodiment of the invention in (a) landscape and (b) portrait orientation.

A third embodiment in accordance with the present invention is illustrated in FIG. 11. FIG. 11a shows a landscape orientation and FIG. 11b shows a portrait orientation. In this embodiment, a Mobile Display Apparatus (MDA) 200 comprises a touch sensitive display tablet or pad 202. Preferably, the MDA 200 is non-foldable. Such an MDA 200 is suitable for mobile Internet or web browsing and, accordingly, includes a transceiver and antenna such as described above with reference to MDA 60 illustrated in FIG. 6.

MDA 200 comprises a touch sensitive virtual keyboard 204 which may be called by a control or function button 206. Optionally, MDA 200 may be utilised without a keyboard as a mere image display means. The display mode (landscape or portrait) for tablet 202 may be selected by using a control or function button 206 and the virtual keyboard 204 configured accordingly.

Optionally, display tablet 202 is associated with a display driver which includes a P/L detector 68a such as described above with reference to FIGS. 6 and 7. P/L detector 68a senses the display mode of an image to be displayed and automatically configures the display accordingly.

MDA 200 also includes speakers 208 which are selectable in accordance with a selected display mode using circuitry such as described with reference to FIG. 7. Thus, stereophonic reproduction may be achieved for both landscape and portrait orientations of MDA 200.

In a particularly suitable embodiment, MDA 200 is substantially "book size" e.g. A4 or A5 size, such as in the portrait orientation as illustrated in FIG. 11(b). Thus, pages of a book or newspaper may be illustrated and pages turned by activating a control button or touching a designated part of the display tablet.

Although circuitry 40 and 80 have been respectively described with reference to the embodiments of FIGS. 4 and 6, it will be readily apparent to a person of ordinary skill in the art that individual features of circuitry 40 and 80 may be combined in any suitable fashion.

As described with reference to FIG. 1 above, stereo sound reproduction is achieved by having two speakers 2, 4, separated from each other on a stereo base 6. Each speaker respectively outputs a left and right channel. The angle at a listener 8 subtended by the stereo base 6 should be around 60° for good stereo reproduction. Although it is preferable for the display apparatus 20 and MDA 60 to have the default display orientation as landscape and the separation of respective speakers 26b/70a and 26d/70b optimised to provide a stereo base providing a 60° angle subtended by a typical viewer/listener; such is not possible for a handheld device such as a PDA 60, or personal audio visual monitor where the stereo base separation should be about 40 cm. Since a device having such a dimension would be too large for portable/hand held applications. It may even not be possible to provide an appropriate stereo base for display apparatus for a TV.

However, for apparatus having a default orientation in which a proper stereo base is provided by the separation distance of the speakers alone, when the orientation of the display apparatus 20 or the display mode of MDA 60 is changed from its default landscape orientation to a portrait orientation the separation of the speakers along the stereo base is reduced. Thus, the stereo base in portrait orientation must be increased in some manner.

Figure 8:
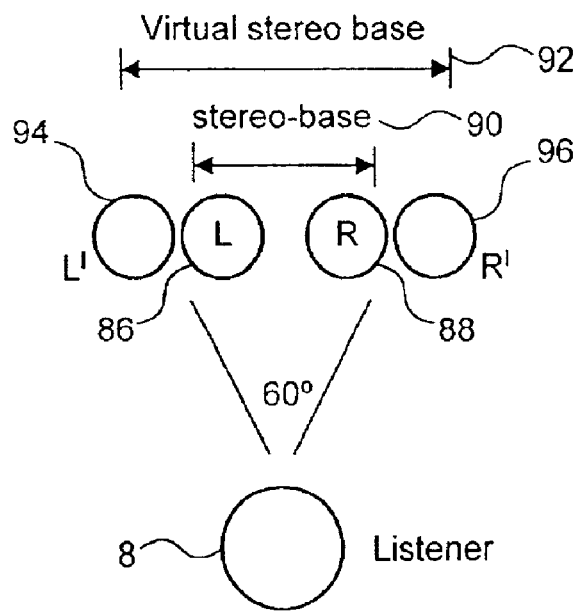
FIG. 8 is a schematic illustration of a virtual stereo base.

Referring now to FIG. 8, a listener 8 is shown receiving a stereo signal from display apparatus 20 or MDA 60 operating in portrait orientation. The real left and right channel speakers are designated 86 and 88 separated along a stereo base 90. However, as described above, the speakers 86 and 88 are insufficiently separated along stereo base 90 to provide proper stereo reproduction, that is to say subtend at an angle of 60° with respect to the listener 8. In order to provide proper stereo reproduction, a virtual stereo base 92 is established electronically, such that speaker 86 appears to be located at a position corresponding to virtual speaker 94 and speaker 88 appears to be located at a position corresponding to virtual speaker 96.

For many apparatus 20/60 it will be necessary to provide a virtual stereo base, or stereo base widening, in both landscape and portrait orientations. Evidently, the stereo base extension necessary in landscape orientation is less than in portrait orientation, since the physical separation in landscape orientation is greater.

Figure 9:
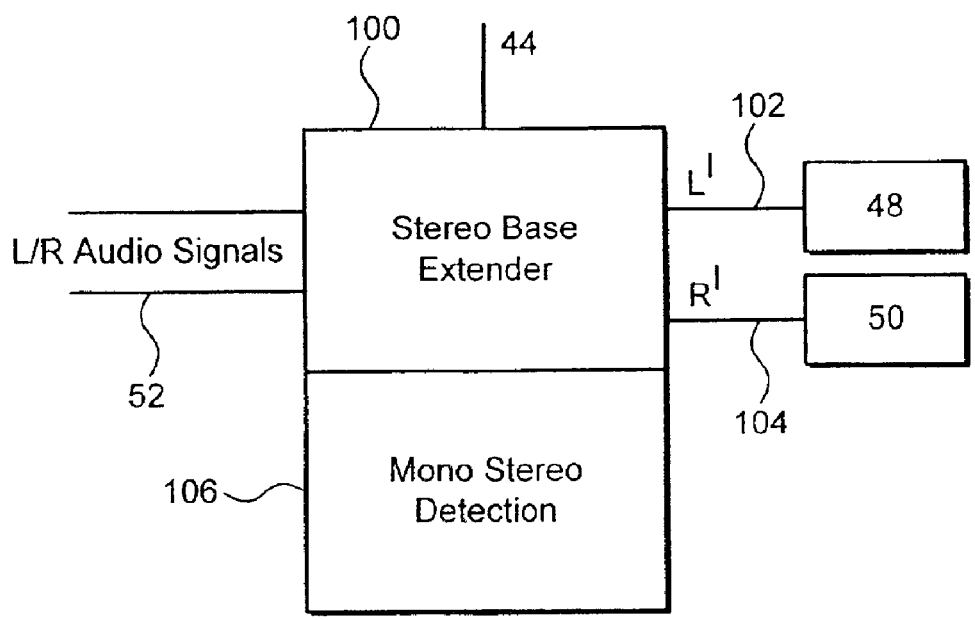
FIG. 9 is a diagrammatic illustration of circuitry for forming a virtual stereo base.

In order to provide the virtual stereo base 92, electronic stereo base extender circuitry 100 as illustrated in FIG. 9 is provided before the inputs of the left and right channel output amplifiers 48, 50 of circuitry 40 and 80. Left/right channel audio signals 52 are input to the electrical stereo base extender 100 where they are modified, for example by introducing a delay (which includes phase inversion) to provide a left channel signal L' 102 to left channel amplifier, and a modified right channel signal R' 104 to right channel amplifier 50. The electronic stereo base extender 100 receives P/L switching signal 44 in order to switch between portrait and landscape orientation stereo base extension modes. Thus, the electrical stereo base extender circuitry 100 modifies the left and right channel signals in order for a listener to perceive a stereophonic image corresponding to a virtual stereo base 92. Optionally, P/L switching signal may have a third state which switches off the stereo base extender 100.

For monophonic signals, there is no difference between the left and right channel signals and therefore an electronic stereo base extender 100 which operates by shifting the delay between respective left and right channels has no or little effect. This can be interpreted as automatic monophonic/stereophonic detection, illustrated as reference 106. However, it should be noted that with other types of extension circuitry a separate mono/stereo detector is necessary in order to turn off the stereo base extender, or route the monophonic signal around it, in order to avoid any corruption of the monophonic signal.

Figure 10:
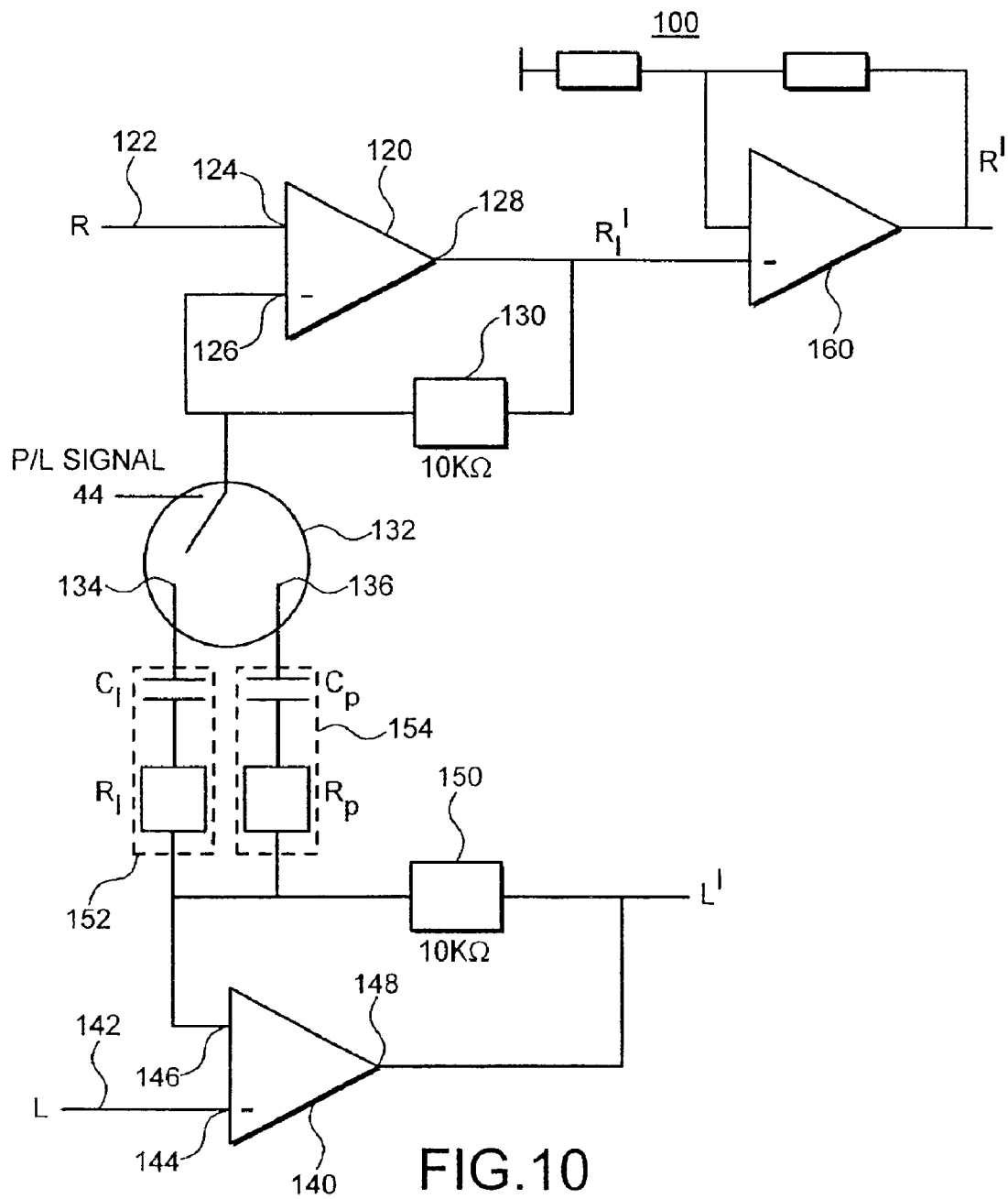
FIG. 10 is a more detailed schematic illustration of the circuitry illustrated in FIG. 9.

An example of electronic stereo base extender circuitry 100 in accordance with a preferred embodiment of the invention is schematically illustrated in FIG. 10. Electronic stereo base extender 100 comprises an operational amplifier 120 having the right audio channel signal 122 communicated to a positive input 124 of the operational amplifier 120. The negative input 126 of the operational amplifier 120 is coupled to the output 128 via a 10 Kohm resistor 130. The signal output from operational amplifier 120 comprises a modified right channel signal $R_1'$. R' is input to operational amplifier 160 which is configured to provide a phase inverter to provide the correct polarity signal for R' which is 180° out of phase with its correct polarity when output from operational amplifier 120. The negative input 126 is also coupled to a switch 132 which is switched under control of P/L switch signal 44 between positions 134 and 136.

A further operational amplifier 140 is also provided and has a left channel audio signal 142 input to its negative input 144. The positive input 146 is coupled to the output 148 via a 10 Kohm resistor 150. The output of operational amplifier 140 is a modified left channel audio signal L'. The positive input 146 is also coupled to resistor capacitor networks 152 and 154, respectively extending to points 134 and 136 of switch 132. Resistor capacitor network 152 comprises a capacitor $C_1$ and resistor $R_1$ for providing a phase delaying impedance corresponding to a landscape orientation of the display. Resistor capacitor network 154 comprises a capacitor Cp and resistor Rp having a phase delaying impedance corresponding to the display in the portrait orientation. The impedance provided in resistor capacitor network 152 should be greater than that provided by capacitor resistance network 154 in order to provide an appropriate difference between respective landscape and portrait stereo bases. For example, the capacitor resistor network 152 should comprise a resistor R1 of 15 Kohms and a capacitor C1 of 33 nF whilst the capacitor resistor network 154 comprises a resistor Rp of 10 Kohm with a capacitance Cp of 22 nF.

Circuitry 100 operates by increasing the phase and amplitude response differences between right and left channel signals by coupling them across to each other by means of the respective impedance networks 152/154. The differences in the right and left channel signals is distorted and exaggerated over the impedance network, which results in a perceived widening of the stereo base (virtual stereo extension) thereby providing a good stereophonic image. A particular advantage of circuitry 100 described above is that the circuit has no or little effect on a monophonic signal and therefore can be utilised for both stereo and monophonic reproduction. It should also be noted that the described circuitry 100 provides stereo extension in both landscape and portrait orientations.

Figure 12:
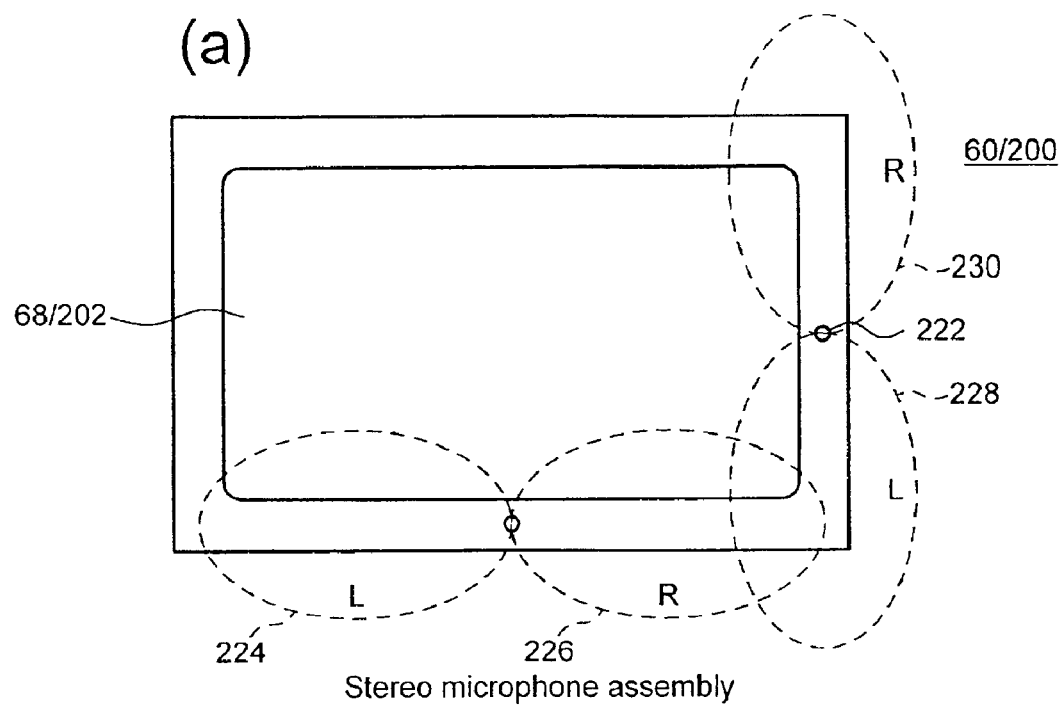
FIG. 12(a) illustrates an MDA having two stereo microphones.
FIG. 12(b) schematically illustrates circuitry for controlling the stereo microphones illustrated in FIG. 12(a)
Figure 12:
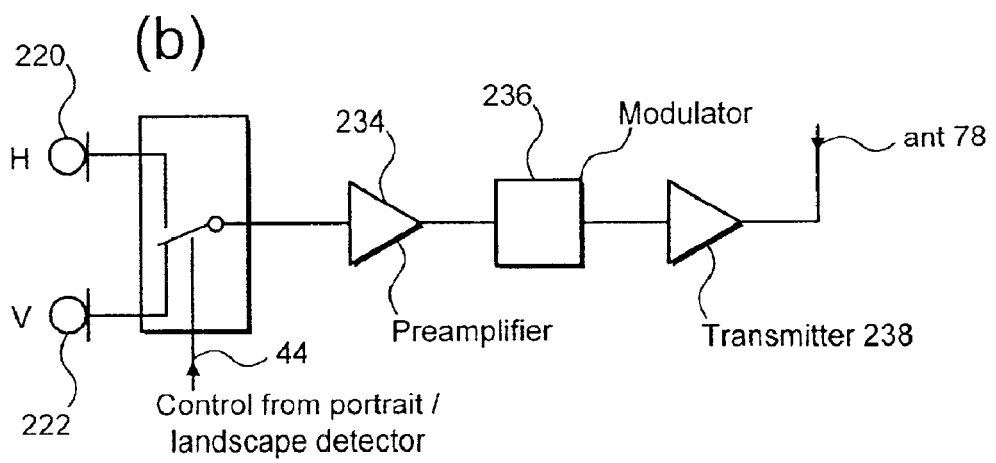

A further embodiment in accordance with the present invention comprises a stereo microphone assembly as illustrated in FIG. 12 of the drawings. The stereo microphone assembly may be utilised by any of the foregoing described display apparatus but is most likely to be used with the MDA 60 and 200, respectively described with reference to FIGS. 6 and 11 of the drawings. FIG. 12(*a*) illustrates the display 68/202 of a MDA 60/200. The display has two stereo microphones 220 and 222 located on its periphery. Stereo microphone 220 is located along the periphery or edge of the display corresponding to the greatest dimension, whilst stereo microphone 222 is located along the edge corresponding to the shortest dimension. Although the stereo microphones 220 and 222 are shown disposed in the centre of the respective edge, this need not be the case. Stereo microphone 220 is disposed for utilisation when the display is in a horizontal or landscape orientation, and the left and right acoustic fields captured by the microphone are represented by dotted outline 224 and 226, respectively. Stereo microphone 222 is located such that it will be used when the display is in a portrait orientation. The left and right acoustic fields received by microphone 222 are illustrated by dotted outline 228 and 230, respectively. Thus, the display apparatus illustrated in FIG. 12(*a*) comprises stereo microphones for operation in both landscape and portrait orientations.

Turning now to FIG. 12(*b*), there is illustrated a simplified schematic diagram of circuitry suitable for implementing a stereo microphone assembly embodiment. Stereo microphones 220/222 are coupled to switch 232 which is operable to couple either microphone 220 or microphone 222 to a pre-amplifier 234. Operation of switch 232 is under the control of the P/L switching signal 44, originating either from the selection means 42 or P/L detector 68a. According to the switching signal 44, either microphone 220 or microphone 222 is coupled through to pre-amplifier 234. The output of pre-amplifier 234 is input to a modulator 236, operating in accordance with a modulation scheme suitable for the wireless communication network for which the MDA is intended. The modulator 236 output is forwarded to a transmitter 238 and thence to an antenna 78. Signals input via the microphones 220 or 222 may also be forwarded to other parts of the MDA, e.g. a voice recognition system or audio feedback loop.

Although the P/L switching signal 44 has been described with reference to the circuitry illustrated in FIGS. 5 and 7 which include the loudspeaker pairs and switches for operating them, this embodiment of the invention may be implemented independently of other orientation sensitive interface mechanisms, or in combination with them.

Figure 13:
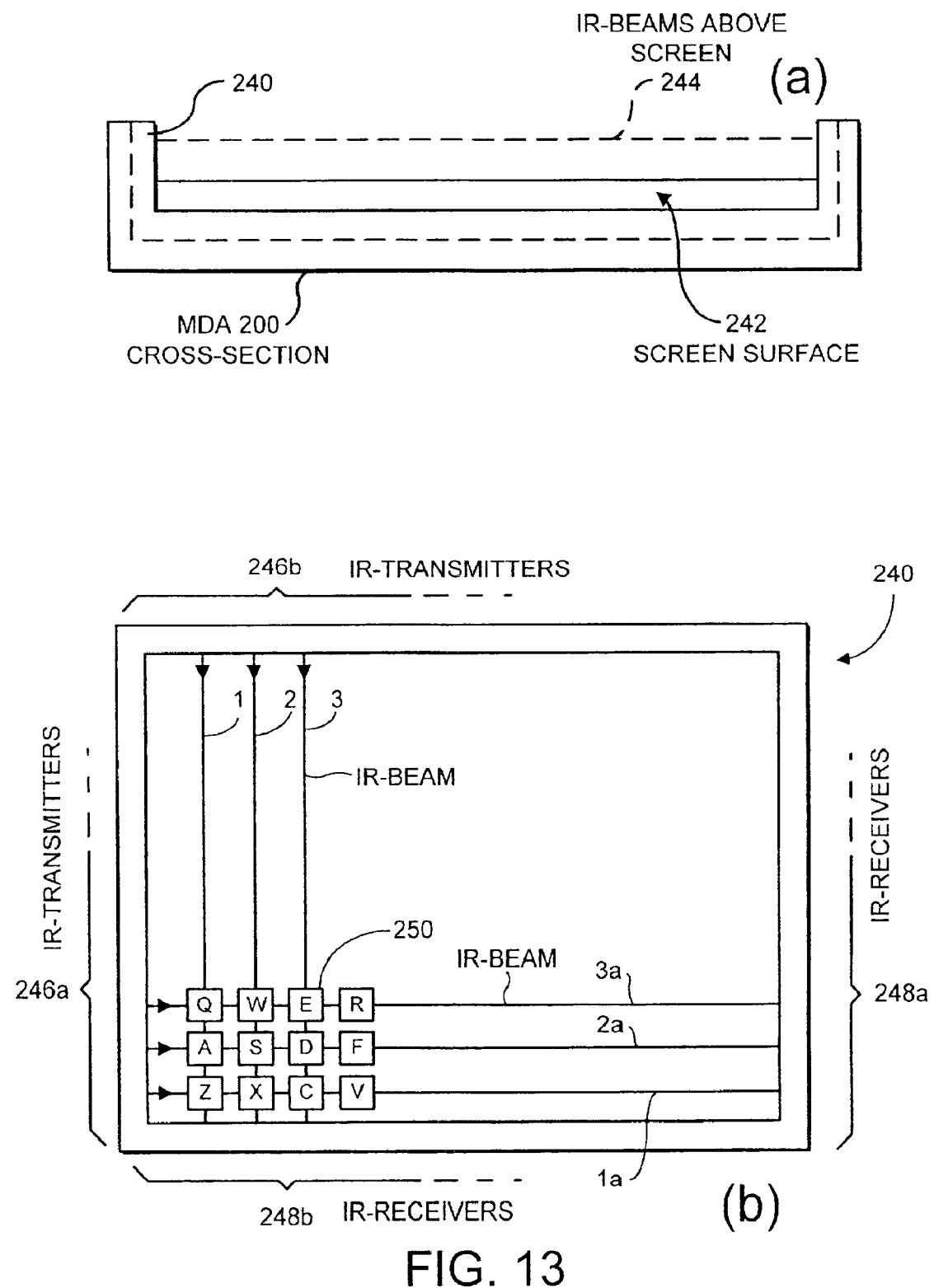
FIG. 13(a) illustrates a cross-section of an MDA incorporating a touch sensitive display.
FIG. 13(b) illustrates a first mode of operation of a touch sensitive display.
FIG. 13(c) illustrates a second mode of operation of a touch sensitive display.
Figure 13:
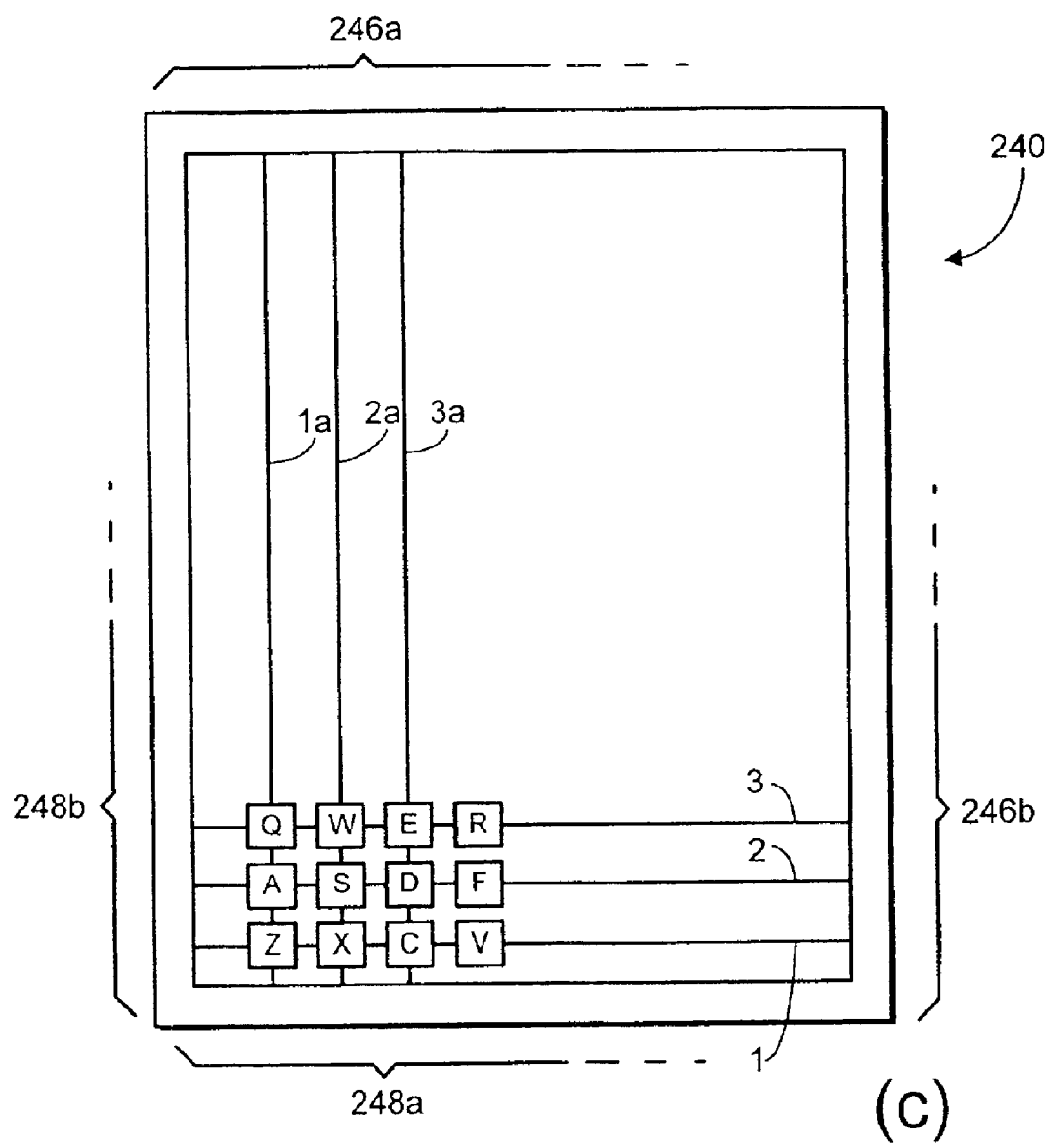

A particularly advantageous embodiment of the invention comprises the display apparatus or MDA having a touch sensitive screen 240 as illustrated in FIG. 13. The touch sensitive display 240 utilises an infrared beam matrix. Such touch sensitive displays are well known, for example see U.S. Pat. No. 4,868,912, issued 19 Sep. 1999, incorporated herein by reference with particular regard to the description of the basic operation of a touch sensitive display.

FIG. 13(a) illustrates a cross-section of a touch sensitive display 240 embodied in an MDA 200. In this simplified illustration, the display 240 includes a display screen surface 242 having infrared beams 244 radiating above the screen surface and traversing from one side of the screen to the other. A more detailed description of the operation of the touch sensitive display will now be provided, with reference to FIGS. 13(b) and 13(c).

Around the periphery of touch sensitive display 240, there are disposed a plurality of infrared transmitters 246, The infrared transmitters are in two groups 246a and 246b, disposed along respective transverse sides of the display. Two groups of infrared receivers 248a and 248b are disposed complementary to respective infrared transmitters 246a and 246b on opposite sides of the display. Each infrared transmitter has a corresponding infrared receiver for receiving infrared signals transmitted therefrom. The arrangement of infrared transmitters 246 and infrared receivers 248 results in a matrix of infrared beams 1,2,3 . . . and 1a,2a,3a . . . disposed in transverse directions to each other. Referring now to FIG. 13(b), the touch sensitive display 240 is shown disposed in landscape mode and having the image of a "QWERTY" keyboard displayed on it. Each intersection 250 of mutually transverse infrared beams corresponds to a key of the keyboard. A user wishing to input the character "e" placed their finger onto or just above the display surface 242 corresponding to the image of the "e" key. The presence of the user's finger at point 250 intersects infrared beams 3 and 3a. The resulting loss of signal 3, 3a from the corresponding infrared receivers is detected by a processor, which may be a processor dedicated to the operation of the touch sensitive display or may be the general control processor for the MDA, and identifies that the user has selected key "e". Similarly, the user may select the symbol "q" by intersecting beams 1 and 3a. The display driver associated with display 240 is configured when the display is in portrait orientation to a display of the QWERTY keyboard in portrait mode. The disposition of respective keys of the QWERTY keyboard in the landscape mode is known by the processor and, consequently, any interruption of a pair of infrared beams may be mapped onto the landscape orientation of the keyboard and the relevant key selected identified by the processor.

If the display 240 is to be utilised in portrait mode as illustrated in FIG. 13(c), then the display driver configures the QWERTY keyboard to fit onto the display in portrait mode. Again, the image of the keyboard is mapped onto the infrared beam matrix such that the interruption of a pair of infrared beams allows the processor to determine which key of the keyboard has been selected. The display driver is configured to operate in either landscape or portrait mode. That is to say, in the landscape mode, it will display an image, a keyboard across a landscape oriented display, and in the portrait mode will display an image of a keyboard across a portrait oriented display. The operation of the display driver is controlled by the P/L switching signal 44 to cause it to operate in either the landscape or portrait mode. This embodiment of the invention may be utilised independently or in combination with the other embodiments.

A modification of this further embodiment does not require a touch sensitive display although one could still be used. In this modification, a graphic symbol such as an icon or cursor having an asymmetric shape is suitably orientated on the display in accordance with the P/L switching signal 44. Thus, a display driver responsive to the P/L switching signal 44 to display an image in either landscape or portrait mode, also drives the display to display an icon, cursor or the like disposed to correspond to the landscape or portrait mode.

Figure 14:
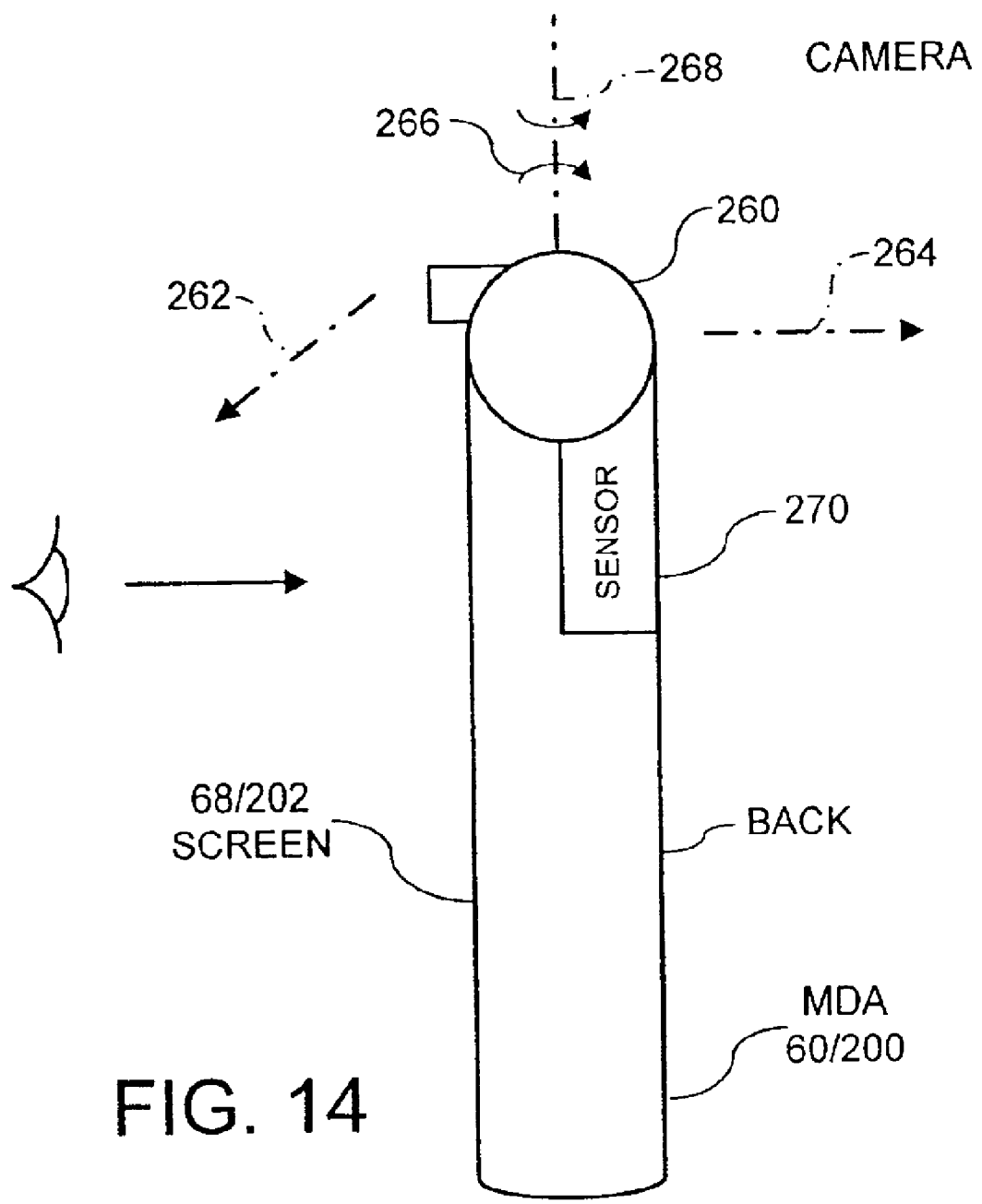
FIG. 14 illustrates an embodiment of the invention including a camera.

In a yet further embodiment of the invention illustrated in FIG. 14, a digital camera 260 is mounted on the MDA 60/200. Preferably, the camera 260 is rotatably mounted such that it can be directed in forward 262 and backward 264 directions. The display driver associated with the screen 68/202 is selectable to operate in two different modes. In the first mode, the display driver displays images in landscape orientation on the display. In a second mode, the display driver displays images in a portrait orientation. Selection of the landscape or portrait mode is under control of a P/L switching signal 44.

The MDA may be configured to operate as a video telephone. In such a configuration, the camera 260 would be directed towards the user in a forwards direction 262. Typically, the other party to the video telephone call would be displayed on the screen 68/202 of the MDA, providing they had video telephony resources. Additionally, a view of the camera image of the user is also displayed in a small portion of the display, in order that the user may monitor the image of themselves which is being transmitted to the other party. The camera may also be used as a conventional still or video camera. For such use, the camera would be swivelled around such that it would now point in a backwards direction 264. The camera may be rotated in a direction indicated 266. If the camera is swivelled in direction 266, then the sensor array for the camera is now "upside down" compared to its previous orientation. A sensor 270 is configured such that it senses the orientation of the camera, i.e. whether it is pointing in direction 262 or 264. The sensor 270 is coupled to a display driver associated with the display screen in order to cause the display driver to display the image in its normal format, such as for the camera pointing in the direction 262, or in a modified format for when the camera is pointing in direction 264. In effect, the display driver rotates the image about an axis perpendicular to axis 268 for rotation of the camera in direction 266.

In another example of an embodiment including a digital camera combined with the MDA, an orientation detector, for example sensor 54 such as described with reference to FIG. 5 above, may be used to determine the orientation of the MDA when it is being used as a still or video camera. In this example, the P/L switching signal 44 would cause the display driver to display the camera image in portrait or landscape display mode in accordance with the sensed orientation. Evidently, the MDA will not always be held in exactly landscape or portrait orientation and a range of sensed orientations would cause selection of either the portrait or landscape display modes. Optionally, this feature may be over-ridden by a user, in order that the display orientation is constant, irrespective of the camera orientation.

In a still yet further embodiment of the invention, a viewing angle for the display of the display apparatus may be modified in accordance with the orientation of the display or display apparatus. Typically, displays are optimised to have a particular viewing angle in accordance with the angle formed between the viewer and the display in normal use. For example, FIG. 15(*a*) illustrates an MDA 200 held substantially vertically with respect to a viewer 300. For such operation, the viewing angle can be substantially 90° with respect to the plane of the display screen 202. The viewing angle, 302, need not be exactly 90° but may be slightly less. However, if it was sufficiently less than 90°, for example as shown with reference 304, then a significant level of the illumination from the display is wasted since it is not seen by the viewer 300. Thus, there would be a range of angles descending down from 90° which would provide suitable viewing angles, such viewing angles would be capable of empirical determination, for example by iterative test measurement.

Figure 15:
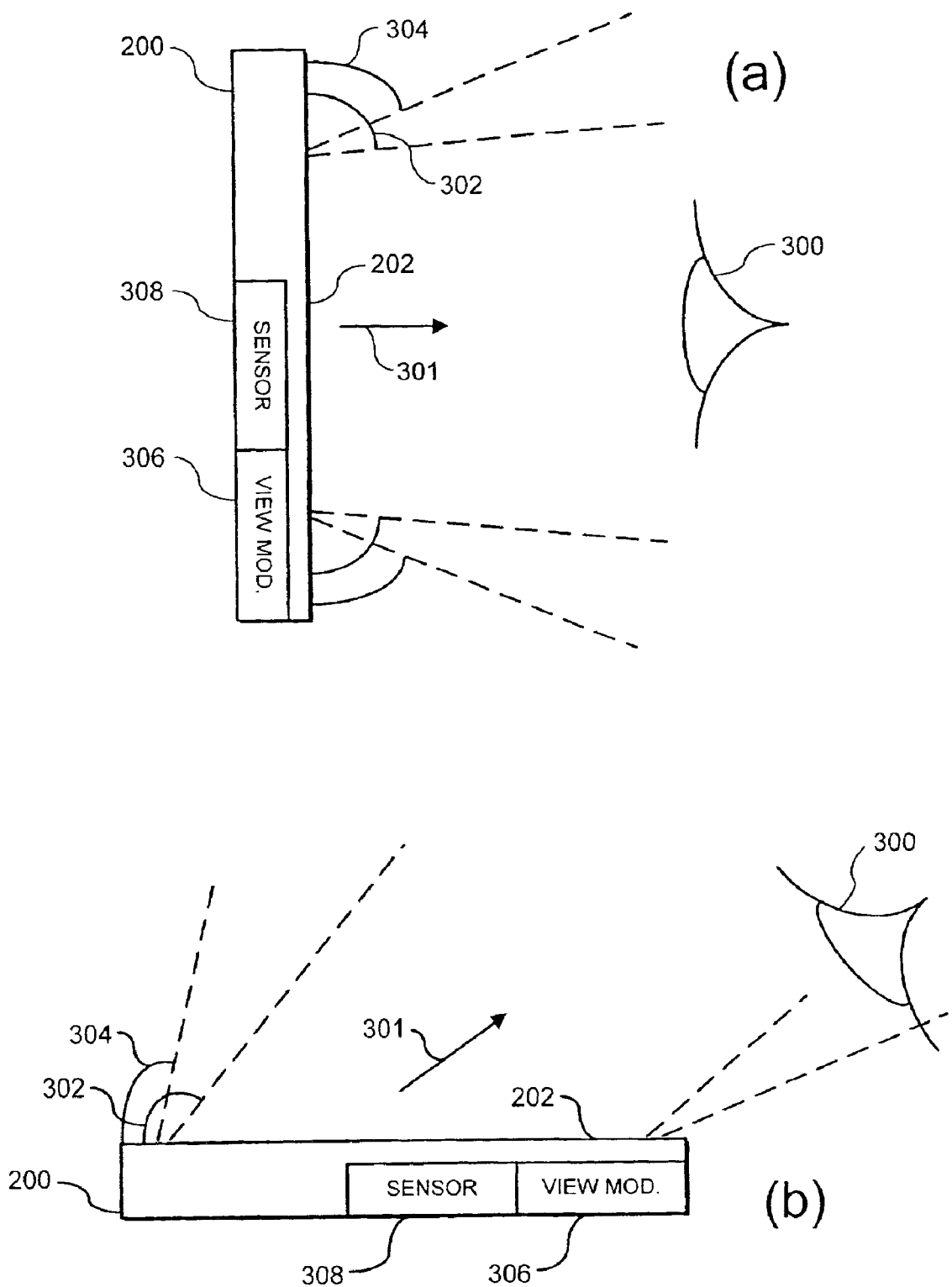
FIGS. 15(a) and (b) illustrate different viewing angles for an MDA.

Optionally, a viewer 300 may place the MDA on a flat surface such as a desk, in which configuration the optimum viewing angle 201 is different to that when the MDA is held substantially vertical as illustrated in FIG. 15(*a*). For the configuration illustrated in FIG. 15(*b*), the angle 302 is around 135° with respect to the display screen 202. As discussed before, the viewing angle may also be less than the optimum viewing angle as illustrated with respect to angle 304, there being a range of suitable viewing angles which may be empirically determined.

In this yet still further embodiment, the MDA includes viewing angle modification circuitry 306 which is configurable to operate in at least two basic modes. The first mode corresponds to the orientation illustrated in FIG. 15(*a*) and the second mode corresponds to the orientation illustrated in FIG. 15(*b*). Thus, in the first mode, the viewing angle modification circuitry 306 is configured to provide a viewing angle of around 90° or less, whereas in the second mode the viewing modification circuitry 306 is configured to provide a viewing angle of around 135° or less. Selection of respective first or second mode is made responsive to the output of an orientation sensor 308 which is configured to sense either vertical or horizontal orientation, with respect to the earth's surface. Preferably, the orientation sensor 308 is capable of sensing orientations between the vertical and horizontal and the viewing angle modification circuitry 306 has modes respectively corresponding to the range of orientations capable of being detected by sensor 308. Ideally, the output of sensor 308 is capable of representing substantially a continuum of orientations between vertical and horizontal to which the viewing angle modification circuitry 306 is responsive to provide a substantial continuum of changes in the viewing angle.

In an embodiment of the MDA 60/200 described above, the antenna is an electronically steerable beam antenna, such as a phased array antenna. Such an antenna may be electronically configured to radiate in a radiation pattern optimised for the orientation of the MDA. The MDA processing resource, such a microprocessor or other programmable logic device controls gain and phase modification elements associated with respective elements of the phased array antenna. The signals fed to the antenna are split between the individual elements and gain/phase circuitry, and suitably modified under the control of the processing resource to radiate from the antenna in a desired radiation pattern. By the principle of reciprocity, the same gain/phase settings provide for reception with the same beam pattern.

In accordance with a preferred embodiment, the gain and phase modification elements are operable in two settings to provide separate beam patterns, each pattern corresponding to an orientation of the MDA. A sensor for sensing the physical orientation of the MDA, such as the orientation detector 54 described hereinabove with reference to FIG. 5, may be coupled to a switch for generating a P/L signal or the like. The P/L signal is input to the processing resource which responds by switching the settings of the gain and phase modification elements to generate a beam pattern corresponding to the sensed orientation of the MDA.

In view of the foregoing description it will be evident to a person skilled in the art that various modifications may be made to the described embodiments. For example, the electrical stereo base extender circuitry 100 need not comprise phase modification circuitry for both landscape and portrait orientations or modes, but may only provide it for one or other of the orientations or modes in order to provide a virtual stereo base. Additionally, although embodiments of the invention have been described with reference to the landscape orientation or mode being the default, it will be evident to a person of ordinary skill in the art that the portrait orientation or mode may be the default and the relevant stereo base extender circuitry 100 modified accordingly. Additionally, more complex and higher order stereo extension systems may be utilised than that described, for example by using digital signal processing techniques.

Furthermore, the display apparatus 20 may include circuitry for selecting a display mode and speaker configuration sensitive to a display mode for an image as described with reference to MDA 60, and MDA 60 may comprise orientation sensing means for selecting a speaker configuration as described with reference to apparatus 20. Features described with respect to the first and second embodiments may be combined in any combination and are not limited to the particular combinations described above.

Optionally, a speaker unused for stereo reproduction in an orientation may be utilised for other purposes. For example, it may be used to provide a ring tone if the MDA is used as a radio telephone. It may also provide audio feedback for the keyboard which would be particularly useful for use with a touch sensitive keyboard.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. Display apparatus comprising:

a display having four corners;

an orientation sensitive interface mechanism operable in first and second modes corresponding to respective first and second orientations of said display;

selection means for selecting operation of said orientation sensitive interface mechanism in said first or second mode; and orientation sensing means for determining an orientation of said display and operable to automatically activate said selection means in accordance with said orientation, said orientation sensing means comprising a display mode sensor responsive to a display mode control signal indicative of a display mode for an image foil display by said display apparatus to automatically activate said selection means in accordance with a sensed display mode;

said orientation sensitive interface mechanism including only three loud speakers:

a first loudspeaker pair comprising a first and second loudspeaker disposed along a first axis corresponding to said first orientation; and a third loudspeaker, said second and third loudspeaker forming a second loudspeaker pair disposed along a second axis corresponding to said second orientation;

said selection means operable to select said first or second loudspeaker pair for operation in said first or second mode, respectively, wherein the three loud sneakers are located at three corners of the display, the three loudspeakers facing in substantially one single direction.

2. Display apparatus according to claim 1, wherein said loudspeakers for respective first and second loudspeaker pairs are disposed relative to each other for providing a substantially stereophonic sound image.

3. Display apparatus according to claim 1, further comprising audio circuitry selectable to adapt a signal input thereto to provide a substantially stereophonic image from said first or second loudspeaker pair.

4. Display apparatus according to claim 3, said audio circuitry configured to receive right and left channel stereophonic signals.

5. Display apparatus according to claim 4, said audio circuitry operable to provide stereo extension means to widen the stereophonic image produced by said first or second loudspeaker pair.

6. Display apparatus according to claim 5, wherein said stereo extension means is operable to introduce a phase delay between said right and left channel stereophonic signals.

7. Display apparatus according to claim 5, wherein said circuitry is selectable to introduce said stereo extension means phase delay for one of said first or second loudspeaker pair.

8. Display apparatus according to claim 6, wherein said right and left channel stereophonic signals are coupled together via circuitry for providing said phase delay.

9. Display apparatus according to claim 4, said audio circuitry operable to provide stereo extension circuitry to widen the stereophonic image produced by said first or second loudspeaker pair.

10. Display apparatus according to claim 9, wherein said stereo extension circuitry is operable to introduce a phase delay between said right and left channel stereophonic signals.

11. Display apparatus according to claim 10, wherein said right and left channel stereophonic signals are coupled together via circuitry for providing said phase delay.

12. Display apparatus according to claim 1, each of said first, second and third loudspeakers comprising more than one drive unit.

13. A method for providing a stereophonic image from display apparatus including an orientation sensitive interface mechanism having only three loud speakers, the method comprising:

configuring said interface mechanism in a first mode to be suitable for first orientation of said display, configuring said interface mechanism in a second mode to be suitable for a second orientation of said display, sensing an orientation of said display, displaying an image in a landscape or portrait mode in accordance with a display mode control signal, automatically selecting said first or second modes for said interface mechanism in accordance with said display mode, and selecting said first or second loudspeaker pair in accordance with an or an orientation of said display, wherein the display has four corners, three loud speakers are located at three corners of the display, and the three loudspeakers face in substantially one single direction.

14. A method according to claim 13, wherein said sensing determines said orientation relative to the surface of the earth.

15. A method according to claim 13, further comprising selecting a landscape or portrait display mode for said display in accordance with selecting said first or second mode.

16. A method according to claim 13, further comprising adapting audio signals to provide a substantially stereophonic sound image from said first or second loudspeaker pairs.

17. A method according to claim 16, further comprising adapting respective right and left channel stereophonic signals for widening the stereophonic image produced by said first or second speaker pair.

18. A method according to claim 16, comprising introducing a phase delay between said right and left channel signals for widening the stereophonic image.

19. A method according to claim 18, comprising introducing said phase delay for one of said first or second loudspeaker pair.

* * * * *

UNITED STATES PATENT AND TRADEMARK OFFICE
CERTIFICATE OF CORRECTION

PATENT NO. : 6,882,335 B2
DATED : April 19, 2005
INVENTOR(S) : P. Saarinen

It is certified that error appears in the above-identified patent and that said Letters Patent is hereby corrected as shown below:

Title page,
Item [56], References Cited, U.S. PATENT DOCUMENTS, please insert the following:
-- 5,986,634     11/1999     Alioshin et al     345/126 --.

Column 19,
Line 18, please change "foil" to -- for --;
Line 23, please change "a first and second" to -- a first loudspeaker and a second --;
Line 26, after "second and third", please change "loudspeaker" to -- loudspeakers --; and
Line 32, please change "loud sneakers" to -- loud speakers --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,882,335 B2
DATED : April 19, 2005
INVENTOR(S) : P. Saarinen

It is certified that error appears in the above-identified patent and that said Letters Patent is hereby corrected as shown below:

<u>Title page,</u>
Item [56], References Cited, U.S. PATENT DOCUMENTS, please insert the following:
-- 5,986,634    11/1999    Alioshin et al    345/126 --.

<u>Column 19,</u>
Line 18, please change "foil" to -- for --;
Line 23, please change "a first and second" to -- a first loudspeaker and a second --;
Line 26, after "second and third", please change "loudspeaker" to -- loudspeakers --; and
Line 32, please change "loud sneakers" to -- loud speakers --.

<u>Column 20,</u>
Line 20, after "three loud speakers,"; please insert -- said three loudspeakers comprising a first loudspeaker, a second loudspeaker and a third loudspeaker, the first loudspeaker and the second loudspeaker forming a first loudspeaker pair, the second loudspeaker and the third loudspeaker forming a second loudspeaker pair, --; and
Line 32, after "said first", please insert -- loudspeaker pair --.

This cerificate supersedes Certificate of Correction issued July 12, 2005.

Signed and Sealed this

Twentieth Day of September, 2005

JON W. DUDAS
*Director of the United States Patent and Trademark Office*